Feb. 21, 1933.  C. M. WERT  1,898,700
TWO-SPEED MECHANISM
Filed April 20, 1932  2 Sheets-Sheet 1

Charles M. Wert
INVENTOR

BY Milburn and Milburn
ATTORNEYS

Charles M. Wert.
INVENTOR

BY Millburn and Millburn
ATTORNEYS

Patented Feb. 21, 1933

1,898,700

UNITED STATES PATENT OFFICE

CHARLES M. WERT, OF CLEVELAND, OHIO, ASSIGNOR OF ONE-THIRD TO FRANK F. PETZNICK, OF CLEVELAND HEIGHTS, OHIO, AND ONE-THIRD TO CLARENCE H. DRAY, OF LAKEWOOD, OHIO

TWO-SPEED MECHANISM

Application filed April 20, 1932. Serial No. 606,487.

This invention relates to a dual ratio or two-speed transmission mechanism of that type associated with the axle assembly of a motor-driven vehicle.

It is to be understood that with the present invention, there is still employed the regular transmission mechanism for establishing the various gear ratios as usual, the purpose being to provide means whereby any given gear ratio thus established can be modified as, for instance, by increasing the same, or can be transmitted to the driven axles without any modification. The present invention contemplates also the possibility of disconnecting the drive shaft from the driven axles, independently of the regular clutch or conventional transmission mechanism.

Accordingly, my invention aims to provide a differential mechanism, to one side of which there is provided a combination of speed-modifying bevel gears with a spider fixedly mounted in an enclosing driving casing and affording a bearing for a speed-modifying compound bevel pinion which co-operates with said speed-modifying bevel gears and the differential mechanism, through the manipulation of other controlling parts, in providing two different speeds for the axle shafts.

My invention also aims to provide a simple, compact, and durable two-speed transmission mechanism wherein companion clutch members are provided upon one of the speed-increasing bevel gears and also upon the driving casing and upon stationary axle housing, as a means for obtaining either normal or modified speeds, or for entirely disconnecting the driven axles from the drive shaft.

My invention further aims to provide a means whereby the lubricating liquid that is thrown by centrifugal force from a large ring gear to certain portions of the housing, will be conveyed thence by gravity through a directing channel to a point where it is again picked up and drawn by centripetal force through openings in the outer driving case by virtue of a suitably formed ring and a co-operatively formed part provided upon said casing.

My invention includes also certain refinements that are advantageous from the standpoint of manufacture and servicing, all of which will be hereinafter specifically described.

Other objects will appear from the following description and claims when considered together with the accompanying drawings.

It is to be understood also that the present form of disclosure is merely for purposes of illustration and that various other modifications may be effected without departing from the spirit of the present invention as herein set forth and claimed.

Figure 1:
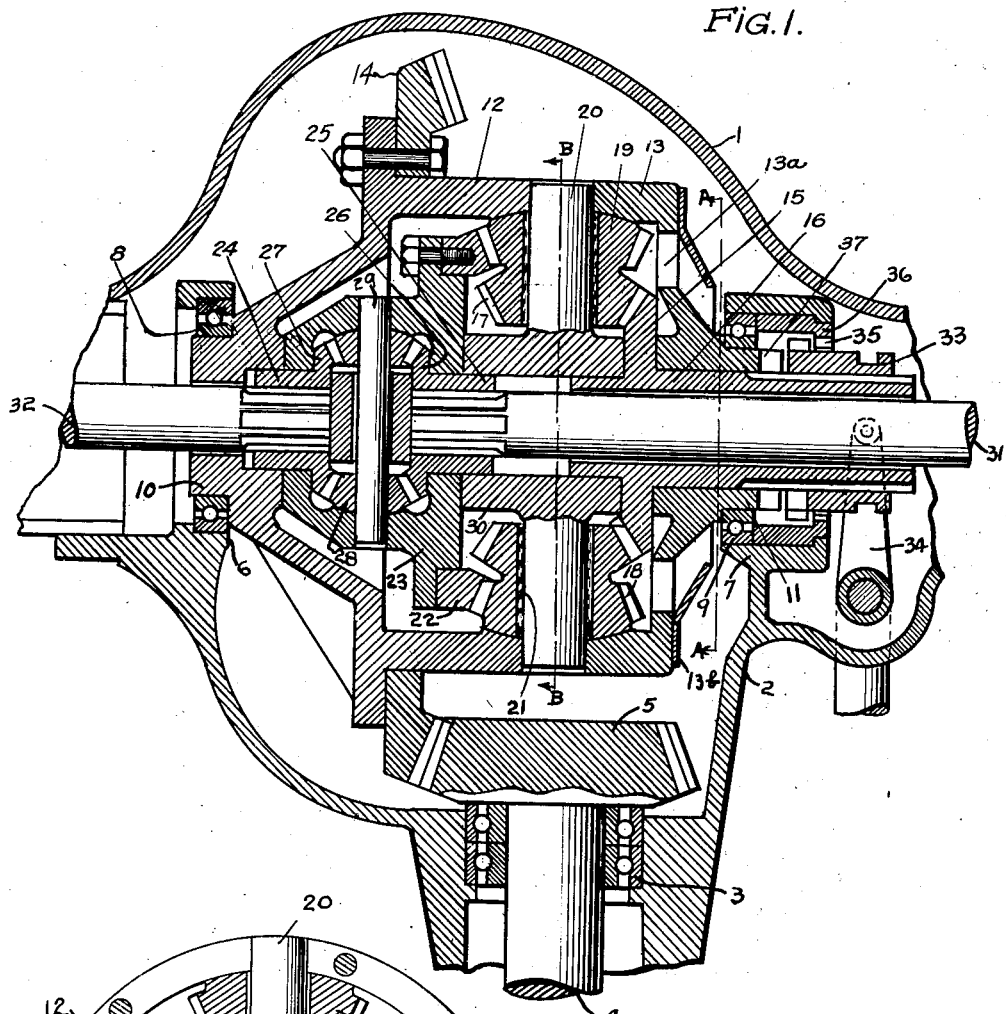
Fig. 1 is a horizontal sectional view of my improved mechanism.

The rear axle housing 1 has a middle portion thereof provided with a detachable plate 2 which has a bearing structure 3 for the support of the drive shaft 4 on which is fixedly mounted a small bevel driving pinion 5. The detachable plate 2 is provided with supports 6 and 7 for the oppositely disposed anti-frictional bearings 8 and 9 which are retained within said supports by any suitable means. Within the anti-frictional bearings 8 and 9 are journalled the co-axially disposed hubs 10 and 11 of the parts 12 and 13, respectively, which are bolted together so as to form an outer driving casing which is provided with the annularly arranged openings 13ª in one end thereof. Attached to the same end thereof is a centripetal ring 13ᵇ with an inwardly extending cone portion surrounding and spaced from the correspondingly formed portion of hub 11. There is also fixedly mounted upon the casing 12—13, the large bevel gear 14 meshing with the small bevel driving pinion 5 of the drive shaft 4.

Figure 4:
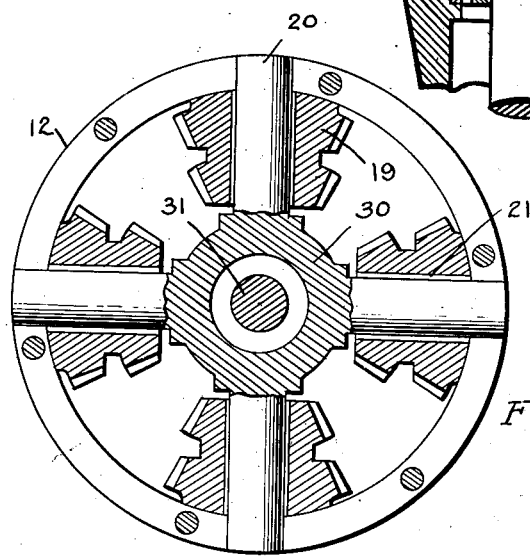
Fig. 4 is taken on line B—B of Fig. 1.

Hub portion 16, journaled co-axially within portion 13, provides a support for speed-increasing bevel gear 15 which meshes with tooth portions 17 of compound bevel pinions 19, of which there are four in number, rotatively mounted upon the right-angularly disposed spider arms 20 by means of any suitable form of bearings indicated in a general way at 21. Spider arms 20 have their end portions rigidly fixed in suitable holes provided in the outer casing portions 12 and 13 by means of supplemental half-openings formed in the abutting edges of these portions. As seen in Fig. 4, there are two pairs of such holes so as to accommodate the two pairs of spider arms 20, and the holes of each pair are located diametrically with respect to each other. The tooth portion 18 of compound bevel pinion 19 meshes with speed-increasing bevel gear 22 which is fixedly mounted upon the casing 23 of the differential mechanism.

The differential gears 26 and 27 are journaled within casing 23 by means of hubs 24 and 25, respectively, which are journaled therewithin and also co-axially within bearing portions provided in the casing 12 and spider 30, respectively. The gears 26 and 27 are splined or keyed to axle shafts 31 and 32, respectively, and mesh with differential pinions 28 which are rotatably mounted on arm 29, which is rigidly fixed in suitable, oppositely disposed holes in the wall of casing 23.

A toothed clutch member 33 is splined or otherwise slidably keyed to the hub portion 16 of speed-increasing bevel gear 15 so as to rotate therewith, said clutch member being shiftable back and forth therealong by a conventional yoke form of shifting device 34, the arms of which engage in a groove in the clutch member and which is pivotally mounted at a suitable point in the plate 2 of the casing for manipulation by the operator through suitable operating connections.

The clutch member 33, when moved in one direction, is engageable with clutch member 35 which forms part of a stationary element 36 on the fixed support 7, and when shifted in the other direction, is engageable with clutch member 37 which forms part of hub portion 11 of the casing 13. This clutch mechanism will be more fully understood from the following description of the operation of the entire speed-increasing mechanism.

According to the accompanying illustration, the two-speed transmission mechanism is in what might be called "neutral" position; that is, the clutch members 33, 35, and 37 are out of engagement. Therefore, the large bevel gear 14 and the outer casing 12—13 may be driven or rotated by the drive shaft 4 without imparting any rotation whatever to the speed-increasing bevel gear 22, the compound bevel pinions 19 and the bevel gear 15 merely turning idly.

To obtain one speed of transmission to the driven axles, for instance that which might be referred to as "normal" speed, the clutch member 33 is shifted into engagement with clutch member 37 of the outer driving casing 12—13. With these clutch members thus engaged, all mechanism within the outer casing 12—13 will revolve as a unit with the outer casing 12—13 and the large bevel gear 14, thus transmitting to the driven axles 31 and 32 the unmodified rate of speed of the drive shaft 4. The rate of speed referred to as "normal" is to be understood as that corresponding to any given gear ratio in the regular transmission.

To obtain the increased rate of speed of transmission to the driven axles, the clutch member 33 is shifted into engagement with clutch member 35 of the stationary element 36, whereby the speed-increasing bevel gear 15 is held stationary. When the speed-increasing bevel gear 15 is thus held stationary and the outer casing 12—13 is rotated through its drive connection from the drive shaft 4, the spider arms 20 are carried in the same direction of rotation as the outer casing 12—13 and the compound bevel pinions 19 roll upon the speed-increasing bevel gear 15, thereby transmitting an increased speed to the speed-increasing bevel gear 22 and imparting correspondingly increased speed of rotation to axle shafts 31 and 32 through the differential casing 23, the arm 29, the differential pinions 28, and the differential gears 26 and 27.

The mechanism of the present invention will of course be operatable also in connection with the regular reverse gear combination, as will be readily understood.

Figure 2:
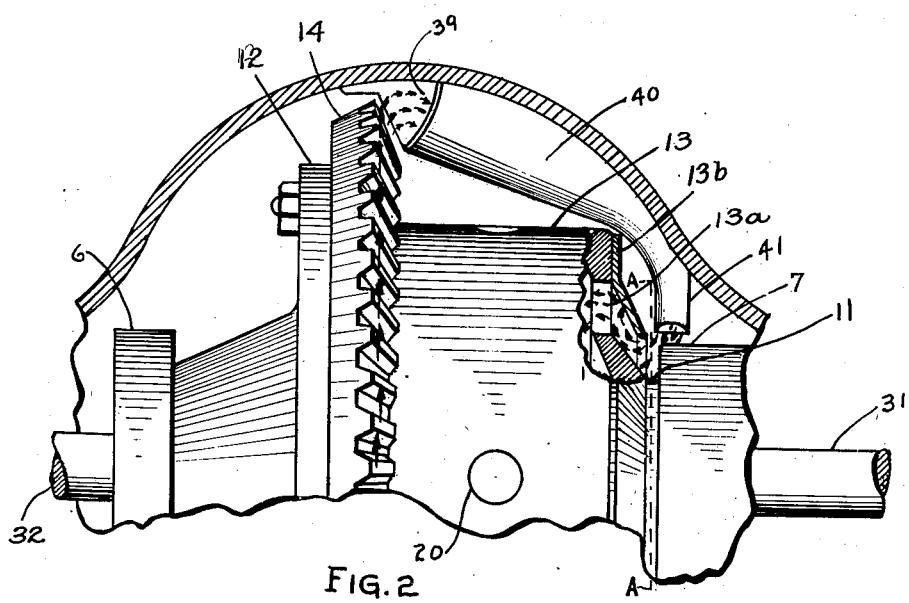
Fig. 2 is a partial vertical sectional view thereof to indicate the channel for the lubricant.
Figure 3:
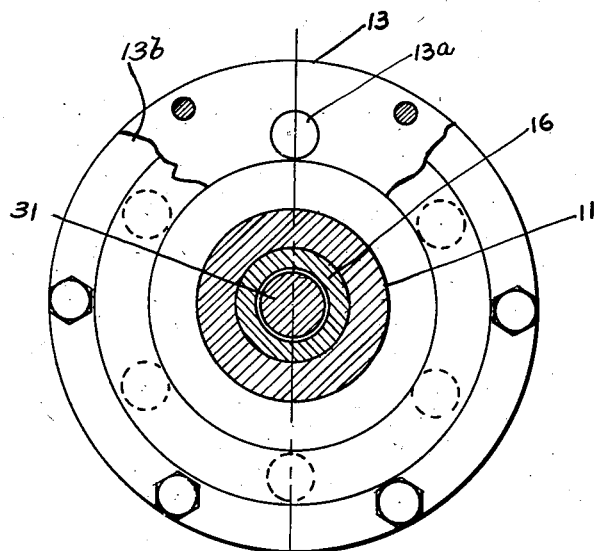
Fig. 3 is taken on line A—A of Figs. 1 and 2.

The large bevel gear 14, rotating at any speed, carries with it a portion of the lubricant in the axle housing 1 and a part of this lubricant will be thrown by centrifugal force from this gear into the enlarged open end 39 of the inclined and tapered conveying channel 40 which is provided at the top of the casing 1. The opening 39 is cut back in an inclined manner upon the near side so as to facilitate the entrance of the lubricant which will be impinged against the inner surface of the far side of the channel member. This portion of the lubricant flows by gravity through the channel 40 and out of the lower discharge in the smaller end of this channel and upon the upper part of the stationary support 7, whence it flows upon the hub portion of outer casing 13, and thence by centripetal force through the passage provided between hub 11 and centripetal ring 38 so as to be drawn through openings 39 to the inside of outer casing 12—13 for lubricating the parts therein. The path taken by this portion of the lubricating liquid is graphically portrayed by dotted lines in Fig. 2 of the drawings.

Among other notable advantages resulting from this invention, I attach considerable importance to the fact that the spiders with the compound pinions mounted thereon are rigidly fixed in the outer driving casing and that the increase in speed is accomplished through a combination of epicyclic bevel gears which are rotatable thereupon. Furthermore, from the manufacturing standpoint, the entire unit may be readily assembled by virtue of the fact that it is supported upon the detachable plate 2 of the axle housing. Also, the present combination is comparatively simple and yet extremely dependable and efficient and is comparatively inexpensive from the stand-point of wear or replacement of parts. The particular system of lubrication constitutes another feature of novelty and contributes to the life of the parts as well as their efficiency.

Thus, I have accomplished an efficient combination of mechanism whereby any given gear ratio of the regular transmission can be either rendered wholly ineffective so far as the driven axles are concerned, or, there can be established an operative connection for transmitting power to the axles either with or without modification of the rate of speed from the drive shaft. In the present form of illustration, there is disclosed a combination in which the axles may be driven at an increased rate of speed as compared with the normal or unmodified speed. However, it is to be understood that there may be devised other forms of mechanism in which the rate of speed may be modified in such manner as to operate the driven axles at a reduced rate of speed as compared with the normal or unmodified speed. Any and all such modifications are to be understood as being comprehended by the present invention as herein described and claimed.

What I claim is:

1. In a speed-modifying mechanism, an outer driving casing, axle shafts extended thereinto, differential gears operatively connected to said axle shafts, a differential casing journaled upon hub portions of said differential gears, differential pinions and an arm therefor serving to connect said differential gears to said differential casing, speed-modifying bevel gears, one of said speed-modifying bevel gears being fixedly connected to said differential casing, mechanism for establishing operative drive connection between said outer casing and said one speed-modifying bevel gear, said mechanism including means for establishing operative connection between said speed-modifying bevel gears, and comprising a spider having its arms fixedly mounted at diametrically opposite points in the wall of said outer casing, compound bevel pinions journaled upon said arms and having operative engagement with said speed-modifying bevel gears, a clutch means adapted to connect the other of said speed-modifying bevel gears to said outer casing for one speed, and a stationary part into engagment with which said other speed-modifying bevel gear may be adjusted by manipulation of said clutch mechanism for the establishment of increased speed.

2. In a speed-modifying mechanism, an outer driving casing, axle shafts extended thereinto, differential gears operatively connected to said axle shafts, a differential casing journaled upon hub portions of said differential gears and located within said outer casing, differential pinions and an arm therefor serving to connect said differential gears to said differential casing, speed-modifying bevel gears located within said outer casing to one side of said differential casing, one of said speed-modifying bevel gears being fixedly connected to said differential casing, mechanism located within said outer casing and to one side of said differential casing for establishing operative drive connection between said outer casing and said one speed-modifying bevel gear, said mechanism including means for establishing operative connection between said speed-modifying bevel gears, a clutch means adapted to connect the other of said speed-modifying bevel gears to said outer casing for one speed, and a stationary part into engagement with which said other speed-modifying bevel gear may be adjusted by manipulation of said clutch mechanism for the establishment of another speed, a lubricant-containing housing enclosing said outer casing, and means actuated by the rotative movement of said outer casing for supplying lubricant to the interior thereof.

3. In a speed-modifying mechanism, a rotatable outer driving casing, axle shafts extended thereinto, differential gears operatively connected to said axle shafts, a differential casing journaled upon hub portions of said differential gears and located within said outer casing, differential pinions and an arm therefor serving to connect said differential gears to said differential casing, speed-modifying bevel gears located within said outer casing to one side of said differential casing, one of said speed-modifying bevel gears being fixedly connected to said differential casing, mechanism located within said outer casing and to one side of said differential casing for establishing operative drive connection between said outer casing and said one speed-modifying bevel gear, said mechanism including means for establishing operative connection between said speed-modifying bevel gears, a clutch means adapted to connect the other of said speed-modifying bevel gears to said outer casing for one speed, and a stationary part into engagement with which said other speed-modifying bevel gear may be adjusted by manipulation of said clutch mechanism for the establishment of another speed, a lubricant-containing housing enclosing said outer casing, and lubricant-conducting means located in the upper part of the lubricant-containing housing and adapted to receive lubricant discharged thereinto by centrifugal force of said outer casing and to convey such lubricant by gravity to the region of the axis of said outer casing, and means associated with said outer casing whereby such lubricant may be supplied to the interior thereof by centripetal force through openings in the wall of said outer casing.

4. In a speed-modifying mechanism, a rotatable outer driving casing, axle shafts extended thereinto, differential gears operatively connected to said axle shafts, a differential casing journaled upon hub portions of said differential gears and located within said outer casing, differential pinions and an arm therefor serving to connect said differential gears to said differential casing, speed-modifying bevel gears located within said outer casing to one side of said differential casing, one of said speed-modifying bevel gears being fixedly connected to said differential casing, mechanism located within said outer casing and to one side of said differential casing for establishing operative drive connection between said outer casing and said one speed-modifying bevel gear, said mechanism including means for establishing operative connection between said speed-modifying bevel gears, a clutch means adapted to connect the other of said speed-modifying bevel gears to said outer casing for one speed, and a stationary part into engagement with which said other speed-modifying bevel gear may be adjusted by manipulation of said clutch mechanism for the establishment of another speed, a lubricant-containing housing enclosing said outer casing, a lubricant-conveying channel member located in the upper part of said lubricant-containing housing and having its upper end located so as to receive the lubricant which may be discharged by centrifugal force from the outside of said rotatable outer casing, said lubricant-containing channel member extending downwardly so as to discharge lubricant by gravity to a point within the region of the axis of said outer casing, the adjacent wall of said outer casing being provided with openings adapted to receive such lubricant and to direct the same therethrough by centripetal force to the interior of said outer casing, the hub portion of said outer casing being provided with a substantially cone-shaped portion, and a centripetal ring member arranged with respect to said cone-shaped portion and said openings so as to provide an annular passage for the lubricant through said openings to the interior of said outer casing.

5. In a speed-modifying mechanism, an outer rotatable driving casing, axle shafts extended thereinto, differential gears operatively connected to said axle shafts, a differential casing journaled upon hub portions of said differential gears, differential pinions and an arm therefor serving to connect said differential gears to said differential casing, speed-modifying bevel gears, one of said speed-modifying bevel gears being fixedly connected to said differential casing, mechanism for establishing operative drive connection between said outer casing and said one speed-modifying bevel gear, said mechanism including means for establishing operative connection between said speed-modifying bevel gears, and comprising a spider having its arms fixedly mounted at diametrically opposite points in the wall of said outer casing, compound bevel pinions journaled upon said arms and having operative engagement with said speed-modifying bevel gears, said spider being mounted for rotative movement co-axially with said axle shafts, a clutch means adapted to connect the other of said speed-modifying bevel gears to said outer casing for one speed, and a stationary part into engagement with which said other speed-modifying bevel gear may be adjusted by manipulation of said clutch mechanism for the establishment of increased speed.

6. In a speed-modifying mechanism, an outer driving casing, axle shafts extended thereinto, differential gears operatively connected to said axle shafts, a differential casing journaled upon hub portions of said differential gears, differential pinions and an arm therefor serving to connect said differential gears to said differential casing, speed-modifying bevel gears, one of said speed-modifying bevel gears being fixedly connected to said differential casing, mechanism for establishing operative drive connection between said outer casing and said one speed-modifying bevel gear, said mechanism including means for establishing operative connection between said speed-modifying bevel gears, a clutch means adapted to connect the other of said speed-modifying bevel gears to said outer casing for one speed, and a stationary part into engagement with which said other speed-modifying bevel gear may be adjusted by manipulation of said clutch mechanism for the establishment of another speed, a lubricant-containing housing surrounding said outer casing and having a readily detachable wall section supporting the mechanism enclosed within said housing.

7. In a speed-modifying mechanism, an outer driving casing, axle shafts extended thereinto, differential gears operatively connected to said axle shafts, a differential casing journaled upon hub portions of said differential gears, differential pinions and an arm therefor serving to connect said differential gears to said differential casing, speed-modifying bevel gears, one of said speed-modifying bevel gears being fixedly connected to said differential casing, and co-axially with said axle shafts, another of said speed-modifying bevel gears being journaled co-axially about one of the said axle shafts, compound epicyclic bevel pinions having meshing engagement between said speed-modifying gears, a spider having its arms fixedly mounted at diametrically opposite points in the wall of said outer housing, said compound pinions being journaled upon the arms of said spider, a clutch means adapted to connect said second-named speed-modifying bevel gears to said outer casing for one speed, and a stationary part into engagement with which said second-named speed-modifying bevel gear may be adjusted by manipulation of said clutch mechanism for the establishment of another speed.

8. In a speed-modifying mechanism, an outer driving casing, axle shafts extended thereinto, differential gears operatively connected to said axle shafts, a differential casing journaled upon hub portions of said differential gears, differential pinions and an arm therefor serving to connect said differential gears to said differential casing, speed-modifying bevel gears, one of said speed-modifying bevel gears being fixedly connected to said differential casing, and coaxially with said axle shafts, another of said speed-modifying bevel gears being journaled co-axially about one of the said axle shafts, compound epicyclic bevel pinions having meshing engagement between said speed-modifying gears, a spider having its arms fixedly mounted at diametrically opposite points in the wall of said outer housing, said compound pinions being journaled upon the arms of said spider, a clutch means adjustable axially upon the hub of said second-named speed-modifying bevel gear and adapted to engage the hub of said outer casing so as to connect said second-named speed-modifying bevel gear therewith for one speed, and a stationary part into engagement with which said second-named speed-modifying bevel gear may be adjusted by manipulation of said clutch mechanism for the establishment of another speed, the hub of said outer casing and said stationary part being spaced sufficiently from each other so as to permit said adjustable clutch means to occupy neutral position therebetween.

In testimony whereof, I hereby affix my signature.

CHARLES M. WERT.